United States Patent
Jang et al.

(10) Patent No.: US 11,971,561 B2
(45) Date of Patent: Apr. 30, 2024

(54) RETROREFLECTIVE STRUCTURE AND LIGHT-EMITTING SAFETY BAND USING SAME

(71) Applicant: BUBO CO., LTD., Hwaseong-si (KR)

(72) Inventors: Tae Hoon Jang, Seoul (KR); Hyun Woo Jang, Yongin-si (KR)

(73) Assignee: BUBO CO., LTD., Hwaseong-si (KR)

( * ) Notice: Subject to any disclaimer, the term of this patent is extended or adjusted under 35 U.S.C. 154(b) by 501 days.

(21) Appl. No.: 17/417,979

(22) PCT Filed: Apr. 15, 2019

(86) PCT No.: PCT/KR2019/004515
§ 371 (c)(1),
(2) Date: Jun. 24, 2021

(87) PCT Pub. No.: WO2020/159004
PCT Pub. Date: Aug. 6, 2020

(65) Prior Publication Data
US 2022/0099870 A1 Mar. 31, 2022

(30) Foreign Application Priority Data

Jan. 31, 2019 (KR) .................. 10-2019-0012447

(51) Int. Cl.
*G02B 5/124* (2006.01)
*F21V 8/00* (2006.01)

(52) U.S. Cl.
CPC .......... *G02B 5/124* (2013.01); *G02B 6/0055* (2013.01)

(58) Field of Classification Search
None
See application file for complete search history.

(56) References Cited

U.S. PATENT DOCUMENTS

2011/0182076 A1* 7/2011 Sherman .............. G02B 6/0055
362/297
2011/0277204 A1* 11/2011 Chan ...................... A41D 13/01
2/22

(Continued)

FOREIGN PATENT DOCUMENTS

JP 2007279020 10/2007
KR 20020022186 3/2002

(Continued)

OTHER PUBLICATIONS

International Search Report—PCT/KR2019/004515 dated Oct. 24, 2019.

*Primary Examiner* — Robert E. Tallman
(74) *Attorney, Agent, or Firm* — CANTOR COLBURN LLP

(57) ABSTRACT

Provided is a retroreflective structure and a light-emitting safety band using same. The retroreflective structure comprises: a switch unit for supplying power, a light source being connected to the switch unit; and a light-emitting unit coupled to the switch unit. The switch unit comprises: a middle plate case having a light transfer body insertion hole formed thereon; an upper plate case coupled to the upper portion of the middle plate case; and a PCB inserted into the middle plate case and the upper plate case. The light-emitting unit comprises: a lower retroreflective film; and a light transfer body installed to be forced against the upper portion of the retroreflective film. The light source is inserted into and installed in a light source insertion groove on an end of the light transfer body having a case engaging unit installed to engage with the light transfer body insertion hole.

3 Claims, 12 Drawing Sheets

(56) References Cited

U.S. PATENT DOCUMENTS

2015/0195890 A1\* 7/2015 Forgey .................... G09F 13/22
                                                          315/307
2018/0132555 A1\* 5/2018 Gonzalez ............... A42B 3/044

FOREIGN PATENT DOCUMENTS

| KR | 20070109307 | 11/2007 |
| KR | 20130052156 | 5/2013 |
| KR | 200470869 | 1/2014 |

\* cited by examiner (a)　　　　(b)

(a)  (b)

(a)             (b)

RETROREFLECTIVE STRUCTURE AND LIGHT-EMITTING SAFETY BAND USING SAME

TECHNICAL FIELD

The present invention relates to a retroreflective structure and a light-emitting safety band using the same, which can correct shortcomings of a conventional light-emitting safety band that intensity of illumination and visibility are reduced due to reduction of the quantity of light transmission by a colored film paper adhered on the upper surface of the light-emitting safety band, and which can reflect light transferred from the outside due to retroreflection in the daytime, and emit light, which is transferred to a light transfer body, to the outside at night and reflect light due to retroreflection in order to increase intensity of illumination and visibility.

BACKGROUND ART

FIG. 4 illustrates a conventional light-emitting structure conceptually.

As illustrated in FIG. 4, in a conventional light-emitting structure used for a light-emitting safety band, intensity of illumination and visibility are reduced since the quantity of light transmission is reduced by a colored film paper adhered on the upper surface.

Therefore, the inventor of the present invention has developed a light-emitting structure using a retroreflective film and a light-emitting safety band using the same, which reflects light transferred from the outside due to retroreflection in the daytime, and emits light, which is transferred to a light transfer body, to the outside at night and reflects light due to retroreflection in order to increase intensity of illumination and visibility.

Moreover, recently, there is a growing need for wearing safety equipment for children, construction workers, firefighting officers, police officers, bicycle users, and electric-driven vehicle users.

The safety equipment 1 is divided into: (1) one thing to protect users from external shock; and (2) the other thing to previously give someone a user's location to give a warning.

In the latter case (2), there is nothing but attaching a fluorescent band or a retroreflective light, but the use rate is low since discrimination is weak and its design is behind.

So, the inventor has developed a light-emitting safety band which can previously give someone a user's location to give a warning, increase discrimination as self-powered light-emitting means and is excellent at design in order to bring an increased demand.

DISCLOSURE

Technical Problem

Accordingly, the present invention has been made in an effort to solve the above-mentioned problems occurring in the prior arts, and it is an object of the present invention to provide a retroreflective structure and a light-emitting safety band using the same, which can correct shortcomings of a conventional light-emitting safety band that intensity of illumination and visibility are reduced due to reduction of the quantity of light transmission by a colored film paper adhered on the upper surface of the light-emitting safety band, and which can reflect light transferred from the outside due to retroreflection in the daytime, and emit light, which is transferred to a light transfer body, to the outside at night and reflect light due to retroreflection in order to increase intensity of illumination and visibility.

Technical Solution

To achieve the above objects, the present invention provides a light-emitting safety band using a retroreflective structure, the light-emitting safety band including: a switch unit 100 connected with a light source L to supply power; and a light-emitting unit 200 coupled to the switch unit 100.

The switch unit 100 includes: a middle plate case 110 having a light transfer body insertion hole 112 formed thereon; an upper plate case 130 coupled to the upper portion of the middle plate case 110; and a PCB 120 inserted into the middle plate case 110 and the upper plate case 130.

The light-emitting unit 200 includes: a lower retroreflective film 230; and a light transfer body 250 mounted to be forced against the upper portion of the retroreflective film 230.

The light source L is inserted into a light source insertion groove 253 on an end of the light transfer body 250 having a case engaging unit 255 mounted to be caught to the light transfer body insertion hole 112.

If the light source L emits light, the light transfer body 250 emits light upwards, downwards, leftward and rightwards, and the retroreflective film 230 retroreflects light emitted downwards by the light transfer body 250 such that the retroreflected light passes through the light transfer body 250 and is emitted outwards.

Advantageous Effects

The retroreflective structure and the light-emitting safety band using the same according to the present invention can correct shortcomings of a conventional light-emitting safety band that intensity of illumination and visibility are reduced due to reduction of the quantity of light transmission by a colored film paper adhered on the upper surface of the light-emitting safety band, and can reflect light transferred from the outside due to retroreflection in the daytime and emit light, which is transferred to a light transfer body, to the outside at night, and reflect light due to retroreflection in order to increase intensity of illumination and visibility.

BEST MODE

Figure 1:
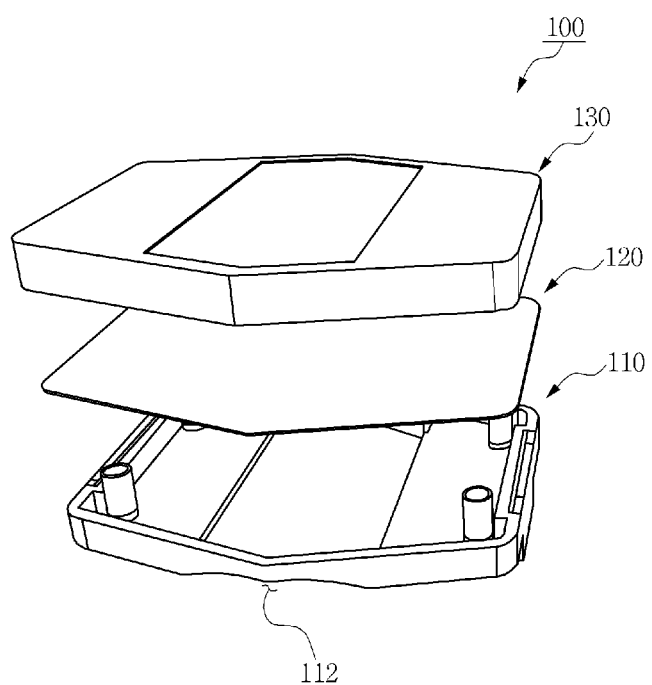
FIG. 1 is an exploded perspective view of a switch unit viewed from the top according to an embodiment of the present invention.

The present invention provides a light-emitting safety band using a retroreflective structure, which includes: a switch unit 100 connected with a light source L to supply power; and a light-emitting unit 200 coupled to the switch unit 100.

The switch unit 100 includes: a middle plate case 110 having a light transfer body insertion hole 112 formed thereon; an upper plate case 130 coupled to the upper portion of the middle plate case 110; and a PCB 120 inserted into the middle plate case 110 and the upper plate case 130.

The light-emitting unit 200 includes: a lower retroreflective film 230; and a light transfer body 250 mounted to be forced against the upper portion of the retroreflective film 230.

The light source L is inserted into a light source insertion groove 253 on an end of the light transfer body 250 having a case engaging unit 255 mounted to be caught to the light transfer body insertion hole 112.

Accordingly, if the light source L emits light, the light transfer body 250 emits light upwards, downwards, leftward and rightwards, and the retroreflective film 230 retroreflects light emitted downwards by the light transfer body 250 such that the retroreflected light passes through the light transfer body 250 and is emitted outwards.

MODE FOR INVENTION

Hereinafter, reference will be now made in detail to the preferred embodiment of the present invention with reference to the attached drawings.

Figure 5:
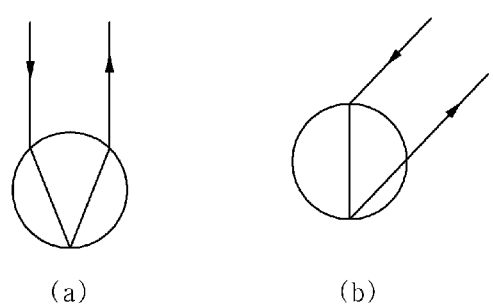
FIGS. 5 and 6 are conceptual views showing a principle of a retroreflective film used in the present invention.
Figure 6:
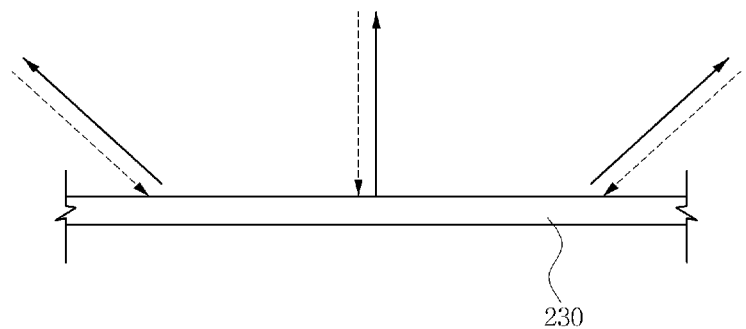

FIGS. 5 and 6 are conceptual views showing a principle of a retroreflective film used in the present invention.

The retroreflective film illustrated in FIG. 6 has fine glass beads coated on the upper portion of a base material so that light is refracted from the glass beads and returns in the same direction as incident light as shown in FIG. 5. The retroreflective film stands out and a visibility range is wide even at night since it is more excellent in reflective performance than general reflective films.

Figure 9:
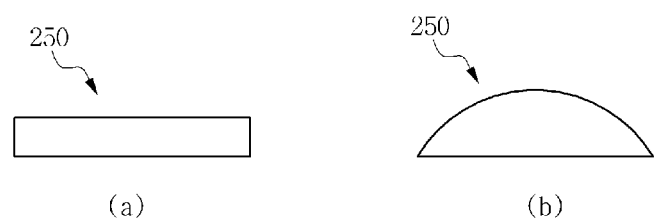
FIG. 9 is a sectional view of the light transfer body used in the present invention.

FIG. 9 is a sectional view of the light transfer body used in the present invention.

Figure 10:
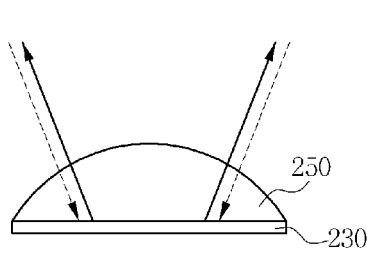
FIG. 10 is a conceptual view showing a luminous effect of the present invention in the daytime and at night.
Figure 10:
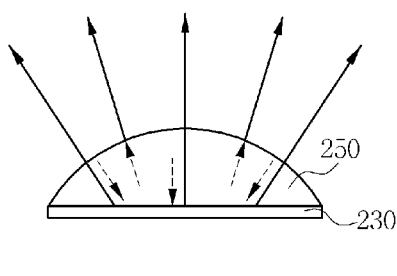

FIG. 10 is a conceptual view showing a luminous effect of the present invention in the daytime and at night.

The retroreflective structure according to the embodiment of the present invention includes:

a retroreflective film 230 located at a lower portion; and
a transparent light transfer body 250 mounted on the upper surface of the retroreflective film 230.

The light transfer body 250 emits light by receiving power or a light source from a switch unit 100.

The retroreflective film 230 retroreflects light emitted from the light transfer body 250 so that the retroreflected light passes through the light transfer body 250 and is emitted outwards.

Furthermore, if a user manipulates the switch unit 100, the light transfer body 250 does not emit light but light received from the outside passes through the light transfer body 250 and is retroreflected from the retroreflective film 230 in the daytime, and the light transfer body 250 emits light at night.

Additionally, the upper surface of the light transfer body 250 in cross section has a curved surface with curvature so that light emitted outwards spreads in all directions.

The light transfer body 250 emits light by receiving power or the light source from both longitudinal ends.

FIG. 1 is an exploded perspective view of a switch unit viewed from the top according to an embodiment of the present invention.

Figure 2:
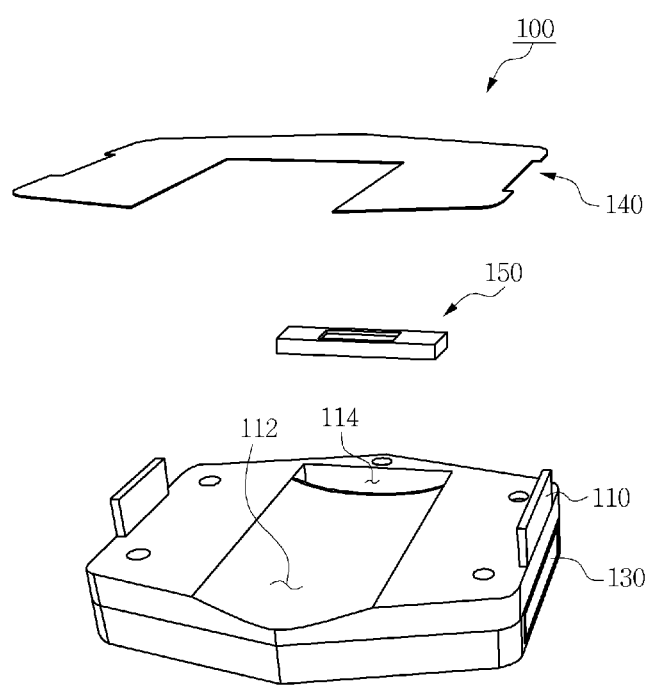
FIG. 2 is an exploded perspective view of the switch unit viewed from the top according to the embodiment of the present invention.

FIG. 2 is an exploded perspective view of the switch unit viewed from the top according to the embodiment of the present invention.

Figure 3:
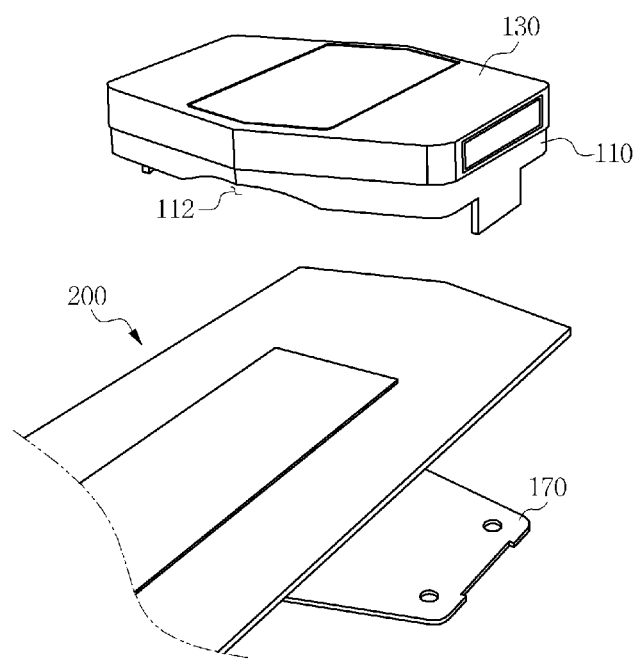
FIG. 3 is an exploded perspective view of a light-emitting safety band using a retroreflective structure according to a first embodiment of the present invention.
Figure 4:
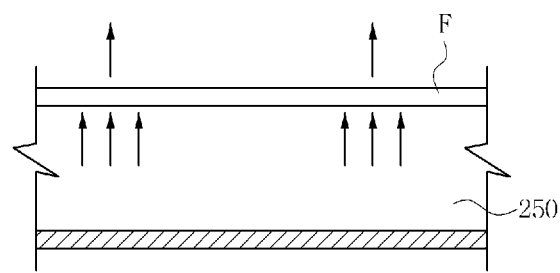
FIG. 4 is a conceptual view of a conventional light-emitting structure.

FIG. 3 is an exploded perspective view of a light-emitting safety band using a retroreflective structure according to a first embodiment of the present invention.

Figure 11:
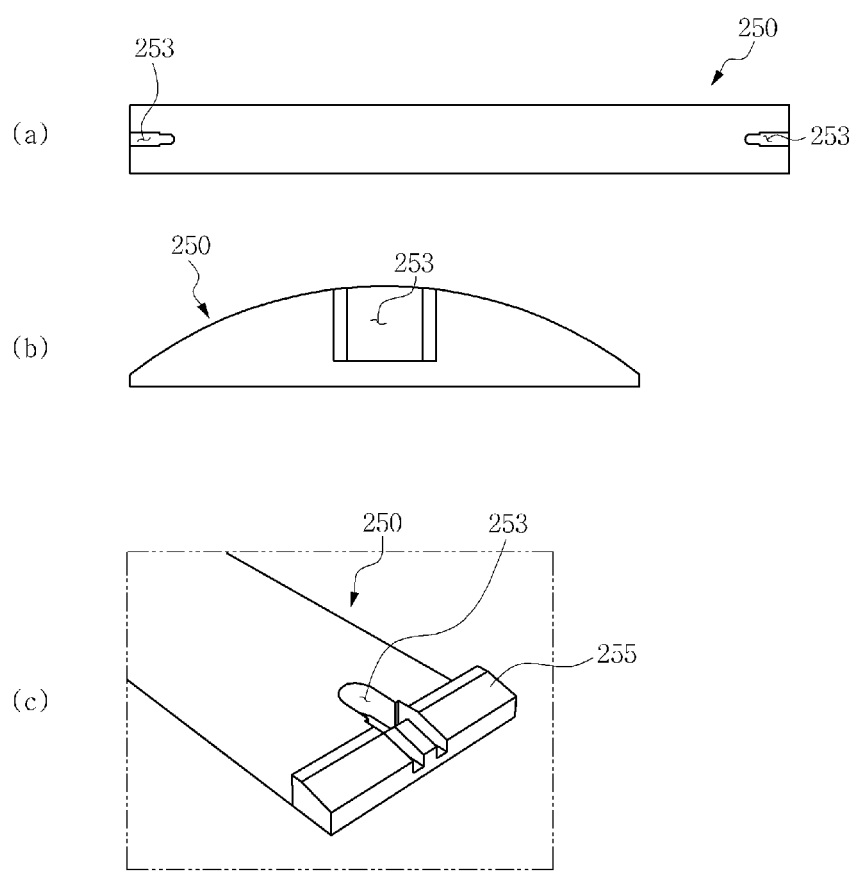
FIG. 11 is (a) a plan view of the light transfer body, (b) a sectional view of the light transfer body, and (c) a perspective view of the light transfer body.

FIG. 11(a) is a plan view of the light transfer body, FIG. 11(b) is a sectional view of the light transfer body, and FIG. 11(c) is a perspective view of the light transfer body.

The light-emitting safety band using the retroreflective structure according to the present invention includes: a switch unit 100 connected with a light source L to supply power; and a light-emitting unit 200 coupled to the switch unit 100.

The switch unit 100 includes: a middle plate case 110 having a light transfer body insertion hole 112 formed thereon; an upper plate case 130 coupled to the upper portion of the middle plate case 110; and a PCB 120 inserted into the middle plate case 110 and the upper plate case 130.

The light-emitting unit 200 includes: a lower retroreflective film 230; and a light transfer body 250 mounted to be forced against the upper portion of the retroreflective film 230.

The light source L is inserted into a light source insertion groove 253 on an end of the light transfer body 250 having a case engaging unit 255 mounted to be caught to the light transfer body insertion hole 112.

Accordingly, if the light source L emits light, the light transfer body 250 emits light upwards, downwards, leftward and rightwards, and the retroreflective film 230 retroreflects light emitted downwards by the light transfer body 250 such that the retroreflected light passes through the light transfer body 250 and is emitted outwards.

As shown in FIG. 3, in order to increase coupling force of the light-emitting unit 200, the light-emitting safety band further includes a lower plate case 170 such that the light-emitting unit 200 is combined in such a way as to be interposed between the middle plate case 110 and the lower plate case 170.

In addition, in order to increase waterproofing performance, the light-emitting safety band further includes a gasket 140 and a pad 150, which are made of a silicon material with good elasticity or the like.

FIG. 10 is a conceptual view showing a luminous effect of the present invention in the daytime and at night.

If a user manipulates the switch unit 100, the light transfer body 250 does not emit light but light received from the outside passes through the light transfer body 250 and is retroreflected from the retroreflective film 230 in the daytime, and the light transfer body 250 emits light at night.

Figure 13:
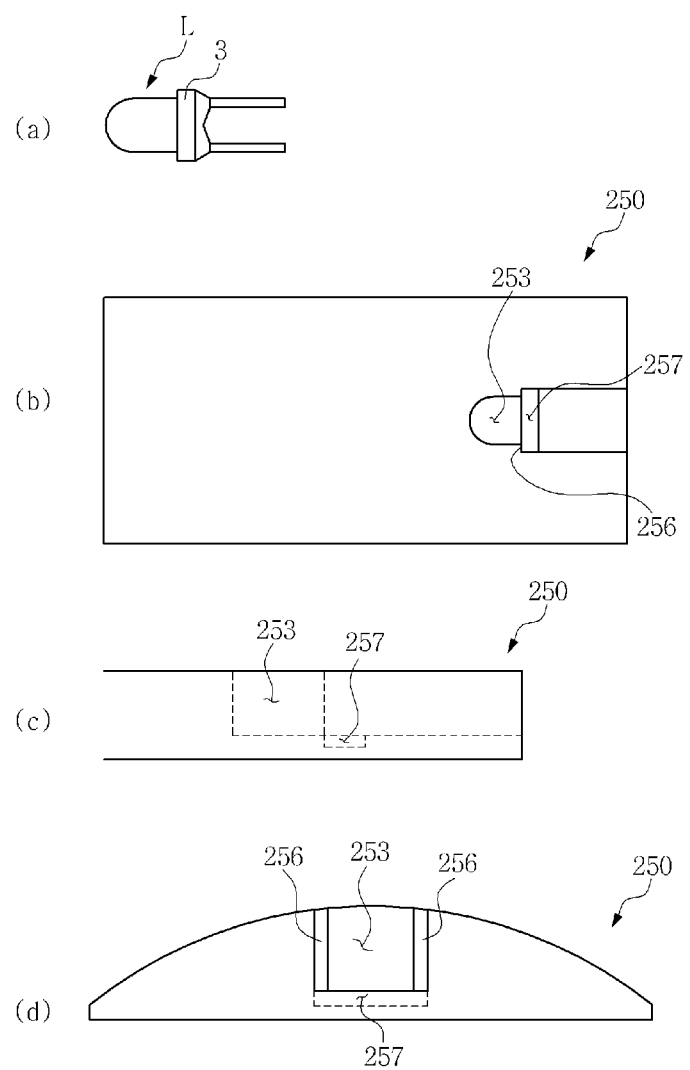
FIG. 13 is a view showing a light-emitting safety band using a retroreflective structure according to a second embodiment of the present invention.

FIG. 13 is a view showing a light-emitting safety band using a retroreflective structure according to a second embodiment of the present invention.

Figure 14:
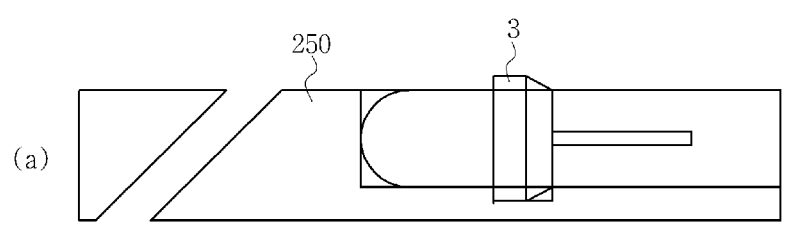
FIG. 14 is an enlarged view showing a state where a light source is inserted into the present invention of FIG. 13.
Figure 14:
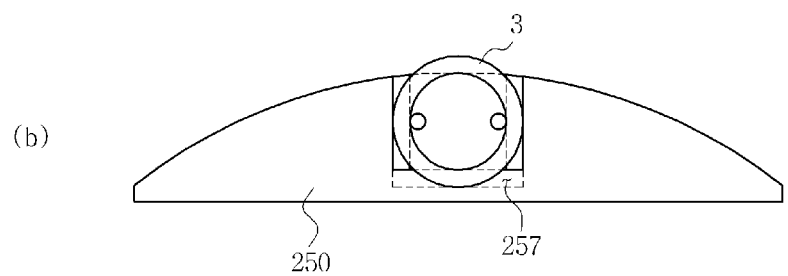

FIG. 14 is an enlarged view showing a state where a light source is inserted into the present invention of FIG. 13.

The light-emitting safety band using the retroreflective structure according to the second embodiment of the present invention includes: a switch unit 100 connected with a light source L to supply power; and a light-emitting unit 200 coupled to the switch unit 100.

The switch unit 100 includes: a middle plate case 110 having a light transfer body insertion hole 112 formed thereon; an upper plate case 130 coupled to the upper portion of the middle plate case 110; and a PCB 120 inserted into the middle plate case 110 and the upper plate case 130.

The light-emitting unit 200 includes: a lower retroreflective film 230; and a light transfer body 250 mounted to be forced against the upper portion of the retroreflective film 230.

The light transfer body 250 includes a light source insertion groove 253, a jaw engaging portion 256 and a jaw insertion portion 257 formed at an end portion thereof. The light source L is inserted into the light source insertion groove 253, and a light source terminal jaw 3 is inserted into the jaw insertion portion 257 to get in contact with the jaw engaging portion 256.

If the light source L emits light, the light transfer body 250 emits light upwards, downwards, leftward and rightwards, and the retroreflective film 230 retroreflects light emitted downwards by the light transfer body 250 such that the retroreflected light passes through the light transfer body 250 and is emitted outwards.

Figure 15:
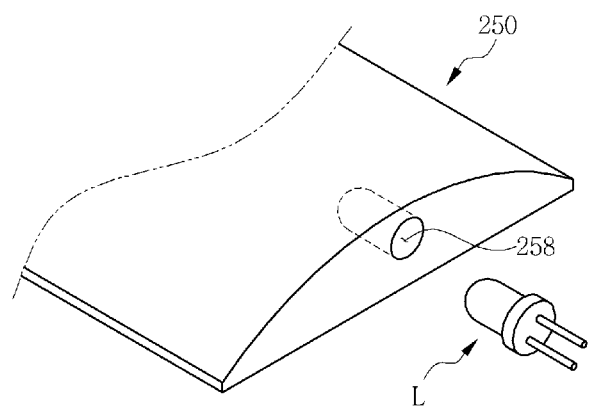
FIG. 15 is a view showing a light-emitting safety band using a retroreflective structure according to a third embodiment of the present invention.

FIG. 15 is a view showing a light-emitting safety band using a retroreflective structure according to a third embodiment of the present invention.

The light-emitting safety band using the retroreflective structure according to the third embodiment of the present invention includes: a switch unit 100 connected with a light source L to supply power; and a light-emitting unit 200 coupled to the switch unit 100.

The switch unit 100 includes: a middle plate case 110 having a light transfer body insertion hole 112 formed thereon; an upper plate case 130 coupled to the upper portion of the middle plate case 110; and a PCB 120 inserted into the middle plate case 110 and the upper plate case 130.

The light-emitting unit 200 includes: a lower retroreflective film 230; and a light transfer body 250 mounted to be forced against the upper portion of the retroreflective film 230.

The light transfer body 250 includes an insertion hole 258 formed at an end portion thereof, and the light source L is inserted into the insertion hole 258.

If the light source L emits light, the light transfer body 250 emits light upwards, downwards, leftward and rightwards, and the retroreflective film 230 retroreflects light emitted downwards by the light transfer body 250 such that the retroreflected light passes through the light transfer body 250 and is emitted outwards.

Figure 7:
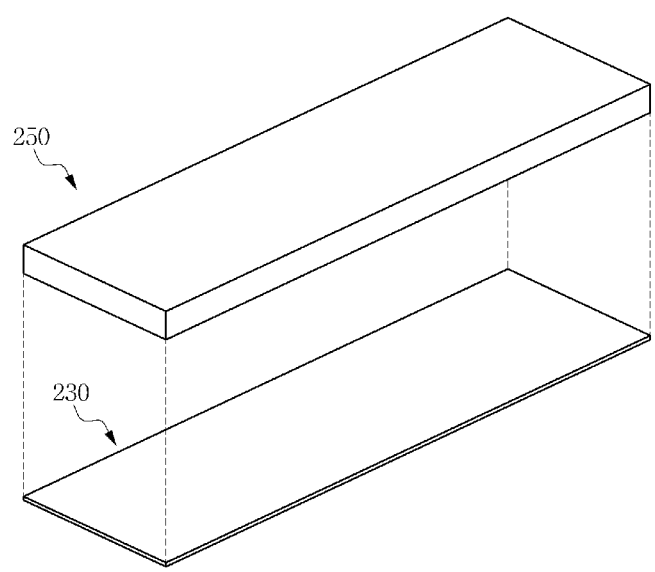
FIG. 7 is an exploded perspective view of a light-emitting unit according to the first embodiment of the present invention.

FIG. 7 is an exploded perspective view of the light-emitting unit according to the present invention.

The light transfer body 250 is made of a transparent material like silicon or urethane and is mainly used to transfer light from an LED light source located at an end portion thereof. Besides the above, the light transfer body 250 may be one among generally used things or may be any one among things obtained by development of technology.

Of course, the light transfer body 250 can provide not only a passive function to transfer light but also functions to supply power and emit light itself.

FIG. 9 is a sectional view of the light transfer body used in the present invention.

As shown in FIG. 9(b), preferably, the light transfer body 250 has a curved surface with curvature formed on the upper surface of the cross section thereof so that light emitted outwards spreads in all directions.

Of course, the cross section of the light transfer body 250 may have various forms in consideration of the spreading direction.

Figure 8:
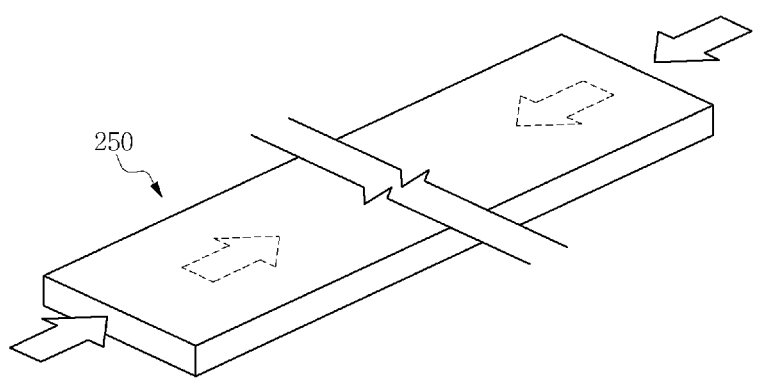
FIG. 8 is a detailed view of a light transfer body used in the present invention.

FIG. 8 is a detailed view of the light transfer body used in the present invention.

As shown in FIG. 8, the light transfer body 250 emits light by receiving power or a light source from both longitudinal ends.

For instance, an LED light source will be described.

If an LED light source is used, conventionally, the LED light source is mounted just at one end portion of the light transfer body 250. SO, it reduces light-emitting efficiency since the further from the LED light source it is, the darker it is. However, the present invention increases light-emitting efficiency since having the structure that LED light sources are mounted at both end portions.

People recognize retroreflected light with various colors since the retroreflective film 230 has various colors.

Therefore, the conventional light-emitting safety band has shortcomings that the quantity of light transmission is reduced due to a colored film paper adhered on the upper surface of the light-emitting safety band and reduces intensity of illumination and visibility. However, the present invention can transmit light with various colors by correcting the shortcomings of the conventional light-emitting safety bands.

The light-emitting unit 200 may be not only an LED band but also general means if it is flexible to be bendable.

Moreover, the switch unit 100 may be general charging means to be rechargeable by receiving power from an external unit through an USB port.

Figure 12:
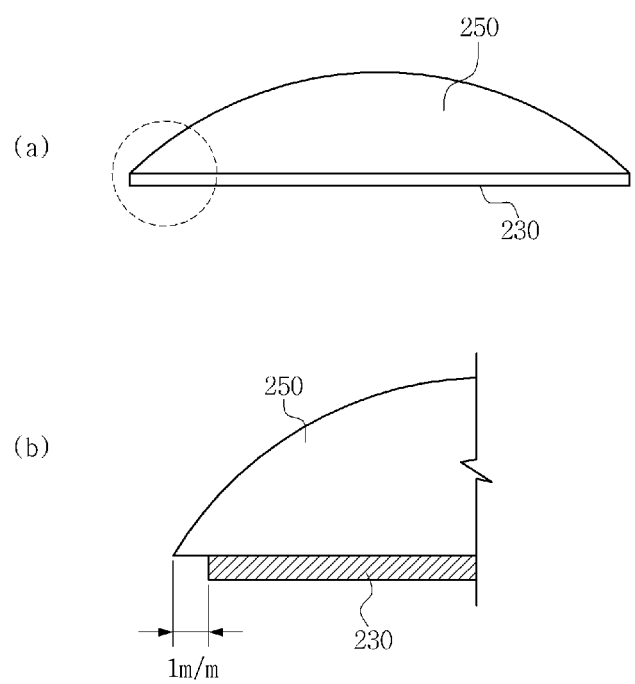
FIG. 12 is a view showing combination relationship between the light transfer body and the retroreflective film.

FIG. 12 is a view showing combination relationship between the light transfer body and the retroreflective film.

FIG. 12(b) is an enlarged view taken along the dotted line of FIG. 12(a).

Preferably, the retroreflective film 230 is adhered at an about 1 mm inward portion from the side end of the bottom surface of the light transfer body 250 to get in close contact with the light transfer body 250 without an air bound. It is why an available space of about 1 mm makes light be brighter from the side since light is circulated through an air layer and makes light go further to the center of the light transfer body 250 by maximizing straightness of light.

While the present invention has been particularly shown and described with reference to exemplary embodiments thereof, it will be understood by those of ordinary skill in the art that various changes and modifications may be made therein without departing from the technical idea and scope of the present invention.

It will be also understood that such changes and modifications within the scope of the present invention belong to the claims of the present invention.

The invention claimed is:
1. A retroreflective structure comprising:
a retroreflective film (230) located at a lower portion; and a transparent light transfer body (250) mounted on the upper surface of the retroreflective film (230), wherein the light transfer body (250) emits light by receiving power or a light source from a switch unit (100), wherein the retroreflective film (230) retroreflects light emitted from the light transfer body (250) so that the retroreflected light passes through the light transfer body (250) and is emitted outwards, wherein the light-emitting safety band comprises:

a switch unit (100) connected with a light source (L) to supply power; and a light-emitting unit (200) coupled to the switch unit (100), wherein the switch unit (100) includes: a middle plate case (110) having a light transfer body insertion hole (112) formed thereon; an upper plate case (130) coupled to the upper portion of the middle plate case (110); and a PCB (120) inserted into the middle plate case (110) and the upper plate case (130), wherein the light-emitting unit (200) includes: a lower retroreflective film (230); and a light transfer body (250) mounted to be forced against the upper portion of the retroreflective film (230), wherein the light source (L) is inserted into a light source insertion groove (253) on an end of the light transfer body (250) having a case engaging unit (255) mounted to be caught to the light transfer body insertion hole (112), and wherein if the light source (L) emits light, the light transfer body (250) emits light upwards, downwards, leftward and rightwards, and the retroreflective film (230) retroreflects light emitted downwards by the light transfer body (250) such that the retroreflected light passes through the light transfer body (250) and is emitted outwards.

2. A retroreflective structure comprising:

a retroreflective film (230) located at a lower portion; and a transparent light transfer body (250) mounted on the upper surface of the retroreflective film (230), wherein the light transfer body (250) emits light by receiving power or a light source from a switch unit (100), wherein the retroreflective film (230) retroreflects light emitted from the light transfer body (250) so that the retroreflected light passes through the light transfer body (250) and is emitted outwards, wherein the light-emitting safety band comprises:

a switch unit (100) connected with a light source (L) to supply power; and a light-emitting unit (200) coupled to the switch unit (100), wherein the switch unit (100) includes: a middle plate case (110) having a light transfer body insertion hole (112) formed thereon; an upper plate case (130) coupled to the upper portion of the middle plate case (110); and a PCB (120) inserted into the middle plate case (110) and the upper plate case (130), wherein the light-emitting unit (200) includes: a lower retroreflective film (230); and a light transfer body (250) mounted to be forced against the upper portion of the retroreflective film (230), wherein the light transfer body (250) includes a light source insertion groove (253), a jaw engaging portion (256) and a jaw insertion portion (257) formed at an end portion thereof, the light source (L) is inserted into the light source insertion groove (253), and a light source terminal jaw (3) is inserted into the jaw insertion portion (257) to get in contact with the jaw engaging portion 256, and wherein if the light source (L) emits light, the light transfer body (250) emits light upwards, downwards, leftward and rightwards, and the retroreflective film (230) retroreflects light emitted downwards by the light transfer body (250) such that the retroreflected light passes through the light transfer body (250) and is emitted outwards.

3. A retroreflective structure comprising:

a retroreflective film (230) located at a lower portion; and a transparent light transfer body (250) mounted on the upper surface of the retroreflective film (230), wherein the light transfer body (250) emits light by receiving power or a light source from a switch unit (100), wherein the retroreflective film (230) retroreflects light emitted from the light transfer body (250) so that the retroreflected light passes through the light transfer body (250) and is emitted outwards, wherein the light-emitting safety band comprises:

a switch unit (100) connected with a light source (L) to supply power; and a light-emitting unit (200) coupled to the switch unit (100), wherein the switch unit (100) includes: a middle plate case (110) having a light transfer body insertion hole (112) formed thereon; an upper plate case (130) coupled to the upper portion of the middle plate case (110); and a PCB (120) inserted into the middle plate case (110) and the upper plate case (130), wherein the light-emitting unit (200) includes: a lower retroreflective film (230); and a light transfer body (250) mounted to be forced against the upper portion of the retroreflective film (230), wherein the light transfer body (250) includes an insertion hole (258) formed at an end portion thereof, and the light source (L) is inserted into the insertion hole (258), and wherein if the light source (L) emits light, the light transfer body (250) emits light upwards, downwards, leftward and rightwards, and the retroreflective film (230) retroreflects light emitted downwards by the light transfer body (250) such that the retroreflected light passes through the light transfer body (250) and is emitted outwards.

\* \* \* \* \*